J. C. LANDKROHN.
LID HOLDER FOR COOKING VESSELS.
APPLICATION FILED JULY 9, 1907.

927,554. Patented July 13, 1909.

WITNESSES:
H. E. Arthur
Alfred Etaul

INVENTOR,
Jesse C. Landkrohn
By
H. C. Dunlap
ATTORNEY.

UNITED STATES PATENT OFFICE.

JESSE C. LANDKROHN, OF JEWETT, OHIO.

LID-HOLDER FOR COOKING VESSELS.

No. 927,554.  Specification of Letters Patent.  Patented July 13, 1909.

Application filed July 9, 1907. Serial No. 382,915.

*To all whom it may concern:*

Be it known that I, JESSE C. LANDKROHN, a citizen of the United States of America, and resident of Jewett, county of Harrison, and State of Ohio, have invented certain new and useful Improvements in Lid-Holders for Cooking Vessels, of which the following is a specification.

This invention relates to new and useful improvements in lid-holders, and more particularly to a cover for cooking utensils and a holder therefor; and it has for its object to provide a simple and convenient form of device whereby the lids or covers of cooking-vessels may be rigidly held in place while the vessel occupies a tilted position, as in draining water from such vessel, and whereby the lid or cover may be conveniently removed or otherwise handled without subjecting the hands of the user to the danger of burning or scalding.

With these and other objects in view, the invention finally consists in the particular construction, arrangement and combination of parts which will hereinafter be fully described, reference being herein had to the accompanying drawing, forming a part of this specification, in which—

Figure 1:
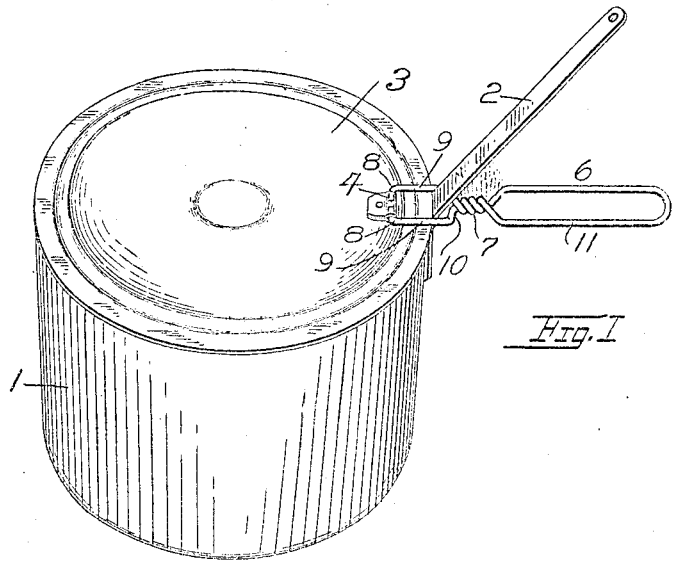
Figure 2:
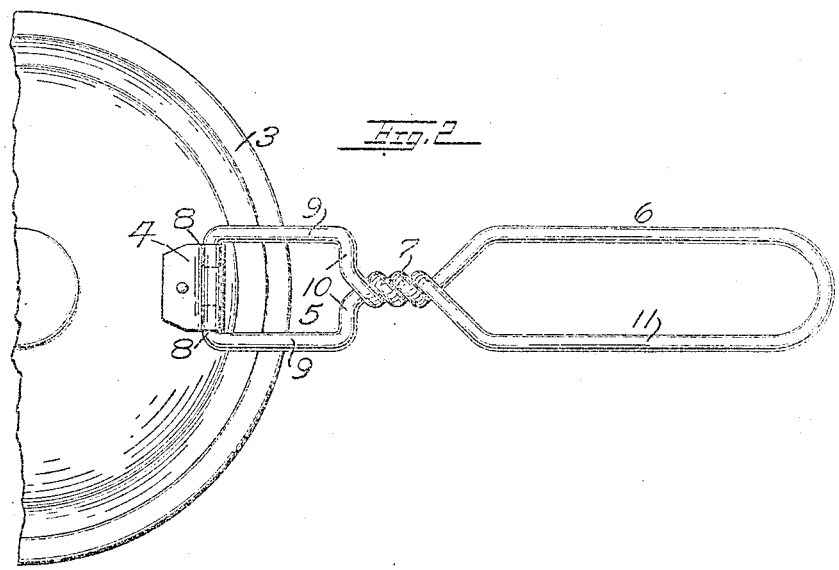

Figure 1 is a perspective view of an ordinary form of cooking vessel, illustrating my invention applied thereto; and—Fig. 2 is an enlarged top plan view of the invention.

Referring to said drawing, in which like designating characters distinguish like parts throughout the several views—1 indicates a common form of cooking vessel having the usual handle 2, and 3 a lid or cover therefor.

Attached to a metal loop 4 which is suitably mounted upon the top of the lid 3 in an appropriate position, preferably adjacent to the edge thereof, is my improved lid-holder, which is formed of one piece of stiff wire. Said lid-holder comprises a substantially rectangular portion 5 through which the vessel-handle 2 projects when the lid or cover 3 is in place, a handle portion 6, and an intermediate body portion 7. Said rectangular portion is formed by the inwardly-turned or approaching terminals 8 which are inserted within said loop 4, two parallel arms 9, and two inwardly-turned or approaching members 10 which together constitute a transverse bearing or fulcrum for bearing against the under side of said vessel-handle 2. Said members 10 converge and are twisted together, as shown, forming said body portion 7.

The handle portion 6 consists of an appropriately shaped loop 11, and is adapted to be grasped simultaneously with the vessel-handle 2 when it is desired to exert a rigid holding or retaining force upon the cover 3, as when the vessel is tilted for draining water therefrom. When it is desired to remove the cover, the handle 6 only is grasped, and the holder and lid are together raised along and slipped off the handle 2. As is obvious, the hand of the user is at all times so far removed from the cover as to avoid any possibility of its being burned from contact with said lid or scalded from escaping steam. When used as a means of retaining the cover in place on the vessel, a powerful force is exerted upon said cover with the application of but slight gripping pressure, owing to the relatively short distance between the fulcrum and the cover.

It will be noted that the holder serves admirably as a hanger for the cover when not in use.

Having thus described my invention, what I claim as new, and desire to secure by Letters Patent, is—

1. A lid lifter comprising in combination with a pot having a lid and a handle, a member pivoted to said lid and having a rectangular loop portion adapted to lie against said lid and embrace said pot handle, and an elongated loop adjoining and formed as a continuation of said rectangular loop and comprising a hand-hold, said loops consisting of a continuous length of wire with a twisted portion separating said loops, whereby said pot handle and said hand-hold may be grasped simultaneously.

2. A lid lifter comprising in combination with a pot having a lid and a handle, a continuous wire handle pivoted to said lid, said wire handle comprising a short rectangular loop pivotally secured at one end to said lid and adapted to lie flat thereagainst, and inclosing said pot handle, a twisted portion adjacent said short loop and adapted to rest behind said pot handle, and a comparatively long loop adjoining said twisted portion and forming a grip, said grip being capable of being simultaneously grasped with said pot handle.

In testimony whereof I affix my signature in presence of two subscribing witnesses.

JESSE C. LANDKROHN.

Witnesses:
J. C. McManus,
Edith M. Hobson.